United States Patent
Jove et al.

(10) Patent No.: US 6,847,500 B2
(45) Date of Patent: Jan. 25, 2005

(54) METHODS AND APPARATUS FOR GRADUALLY DECREASING SUPPLY CURRENT DEMAND IN ARM ELECTRONICS FOR WRITE-TO-READ TRANSITIONS

(75) Inventors: Steven Alan Jove, Watsonville, CA (US); Calvin Shizuo Nomura, San Jose, CA (US); Kevin Roy Vannorsdel, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 562 days.

(21) Appl. No.: 09/947,741

(22) Filed: Sep. 6, 2001

(65) Prior Publication Data

US 2003/0048559 A1 Mar. 13, 2003

(51) Int. Cl.[7] .................................................. G11B 5/09
(52) U.S. Cl. ............................................. 360/46; 360/66
(58) Field of Search ..................................... 360/46, 66–68

(56) References Cited

U.S. PATENT DOCUMENTS

| | | |
|---|---|---|
| 4,303,951 A | 12/1981 | Hack |
| 4,479,151 A | 10/1984 | Lia et al. |
| 4,553,178 A | 11/1985 | Lynch |
| 4,622,599 A | 11/1986 | Norton, Jr. |
| 5,327,297 A | 7/1994 | Enami et al. |
| 5,444,579 A | 8/1995 | Klein et al. |
| 5,574,702 A * | 11/1996 | Ishii .......................... 369/13.22 |
| 5,724,201 A * | 3/1998 | Jaffard et al. ................... 360/62 |
| 5,822,141 A * | 10/1998 | Chung et al. .................. 360/46 |
| 6,064,261 A | 5/2000 | Stein et al. |
| 6,067,202 A * | 5/2000 | Rowan et al. ............ 360/73.03 |
| 6,118,611 A | 9/2000 | Shibasaki et al. |
| 6,621,649 B1 * | 9/2003 | Jiang et al. ..................... 360/67 |

* cited by examiner

Primary Examiner—Sinh Tran
Assistant Examiner—Varsha A. Kapadia
(74) Attorney, Agent, or Firm—John J. Oskorep, Esq.

(57) ABSTRACT

Arm electronics (AE) suitable for use in a disk drive are disclosed. The AE has write circuitry configured to operate the AE in a write mode during which a write mode supply current is drawn, and read circuitry configured to operate the AE in a read mode during which a read mode supply current is drawn. The AE uses a decaying current pulse generator that generates a decaying current pulse at the beginning of each write-to-read mode transition. The decaying current pulse has an initial value that is equal to the difference between the write mode supply current and the read mode supply current. This controlled load forces the AE to draw a gradually decreasing supply current for each write-to-read mode transition such that supply voltage transients (otherwise present due to parasitics in cabling between the AE and power supply) are reduced. Thus, the undesirable effects of such transients in the read circuitry are reduced so that write-to-read mode recovery times can be shortened.

16 Claims, 5 Drawing Sheets

METHODS AND APPARATUS FOR
GRADUALLY DECREASING SUPPLY
CURRENT DEMAND IN ARM
ELECTRONICS FOR WRITE-TO-READ
TRANSITIONS

BACKGROUND OF THE INVENTION

1. Field of the Invention

The present invention relates generally to arm electronics (AE) in disk drives, and more particularly to methods and apparatus for gradually decreasing the supply current demand in the AE for write-to-read mode transitions to reduce signal transients.

2. Description of the Related Art

Conventional disk drives have write-to-read mode recovery times that are either too long or, if reduced, allow for unreliable data detection due to unsettled signal transients generated during write-to-read mode transitions and the less than infinite power supply rejection ratios (PSRRs) of preamplifiers used in read mode circuitry.

To illustrate, FIG. 1 is a block diagram of relevant components of a conventional disk drive 100 having conventional arm electronics (AE) 104. AE 104 is typically embodied on a single integrated circuit (IC) chip. AE 104 includes reference circuitry 108, a controller 110, read mode circuitry 112, and write mode circuitry 114. Disk drive 100 has a power supply 102 which supplies power to AE 104 through a cable 106 (e.g., a flex connector). More particularly, power supply 102 provides supply voltages $+V_{cc}$ and $-V_{ee}$ via cable 106 at conductive pads of a power supply input 107. Supply voltages $+V_{cc}$ and $-V_{ee}$ used by AE 104 may be, for example, +5 volts and −5 volts, respectively. Reference circuitry 108 provides a reference voltage $V_{REF}$ which is also used in AE 104.

Read mode circuitry 112 and write mode circuitry 114 are separate circuits which are optimized for their specific functions so that the overall power dissipation in AE 104 is low. Read mode circuitry 112 is coupled to a plurality of read heads, such as a read head 120, for reading data from a plurality of disks, such as disk 106, during a read mode of operation. In the read mode, the basic functions of read mode circuitry 112 are active whereas the basic functions of write mode circuitry 114 are generally inactive. Read data are read from disk 106 by read head 120, passed to read mode circuitry 112, and provided at a read output 116 for further processing. During steady-state read mode, a read mode supply current is drawn from power supply 102 through cable 106. The read mode supply current is less than the write mode supply current. The reason for this difference is because during the write mode where write mode circuitry 114 is active, some portions of read mode circuitry 112 still remain active. The read mode supply current may be, for example, about 60 milliamps.

Read mode circuitry 112 includes, as shown in FIG. 3, a preamplifier 302 which is coupled to the supply voltages $+V_{cc}$ and $-V_{ee}$. During the read mode, preamplifier 302 receives very small signals from read head 120 (FIG. 1) at a preamplifier input 304 and amplifies these signals to produce amplified signals at a preamplifier output 306. Preamplifier 302 has a high gain which makes read mode circuitry 112 extremely sensitive. If the supply voltages $+V_{cc}$ and $-V_{ee}$ are not sufficiently stable, the amplified signals at preamplifier output 306 will be adversely affected and data detection will be unreliable.

Referring back to FIG. 1, write mode circuitry 114 is coupled to a plurality of write heads, such as a write head 122, for writing data to disk 106 during a write mode of operation. In the write mode, basic functions of write mode circuitry 114 are active whereas the basic functions of read mode circuitry 112 are generally inactive. Write data are fed into write mode circuitry 114 at a write input 118, passed to write head 122, and written to disk 106. During steady-state write mode, a write mode supply current is drawn from power supply 102 through cable 106. The write mode supply current is greater than the read mode supply current, for the reason previously stated above. The write mode supply current may be, for example, about 210 milliamps.

Controller 110 of FIG. 1 provides a read/write (R/W) mode signal 124 for activation and deactivation of read and write mode circuitry 112 and 114 during disk drive operation. In particular, when controller 110 instructs AE 104 to transition from the write mode to the read mode, an abrupt change from the write mode supply current to the read mode supply current occurs. This abrupt change in current is illustrated in FIG. 4 by a write-to-read current transition requirement 402. As shown, write-to-read current transition requirement 402 reflects a step or step-like discontinuity. In this particular example, the abrupt current change is about 150 milliamps, which is the difference between the write mode supply current of about 210 milliamps and the read mode supply current of about 60 milliamps.

In response to this step or step-like discontinuity, cable 106 (FIG. 1) imposes undesirable fluctuations in voltage at power supply input 107 of AE 104. The reason this occurs is because cable 106 has inherent parasitic series inductance and capacitance as well as power supply decoupling capacitors placed at various locations in and along cable 106 which form a cable network of R-L-Cs (i.e., resistors, inductors, and capacitors). In FIG. 2, an example of a lumped-parameter model 200 of this cable network is shown. In FIG. 5, an example of write-to-read supply voltage transition signals 502 and 504 ($+V_{cc}$ and $-V_{ee}$, respectively) having voltage fluctuations 506 is shown. Thus, supply voltage transients are produced due to the non-ideal connector coupled between AE 104 and power supply 102.

Due to such voltage fluctuations, preamplifier output 306 of FIG. 3 will exhibit an undesirable response since its power supply rejection ratio (PSRR) is finite. In FIG. 6, a preamplifier output signal 602 having undesirable output fluctuations 604 due to the voltage fluctuations 506 of FIG. 5 is shown. Due to such fluctuations, any data detection at the beginning of the read mode will be corrupted or unreliable. Since unreliable data detection is not acceptable, the transition time between write and read modes (i.e., the "write-to-read recovery time") which is imposed by subsequent detection circuitry is longer than it would otherwise have to be. It is generally desirable and advantageous, however, to keep the write-to-read recovery time in a disk drive as short as possible so that it can operate quickly and allow for a large amount of data to be written to a disk over a given time period.

In the prior art, improving circuit PSRR has been approached as a means to mitigate transient recovery problems, but such an approach can only correct the problem to a limited degree. Another approach would be to include additional reference circuitry in the AE to regulate supply voltage for the sensitive read circuitry. However, such additional circuitry consumes additional power and imposes difficult design challenges due to reduced voltage headroom available to the sensitive read circuitry.

SUMMARY OF THE INVENTION

To overcome the aforementioned deficiencies of the prior art, special methods and apparatus for use in arm electronics (AE) are disclosed. The AE has write mode circuitry configured to operate the AE in a write mode during which a write mode supply current is drawn, and read mode circuitry configured to operate the AE in a read mode during which a read mode supply current is drawn.

The AE utilizes a unique decaying current pulse generator for generating a decaying current pulse at the beginning of each transition from the write mode to the read mode. Preferably, the decaying current pulse has an initial value that is equal to the difference between the write mode supply current and the read mode supply current. This "controlled load" forces the AE to draw a gradually decreasing supply current for each write-to-read mode transition, such that supply voltage transients (otherwise present due to parasitics in the cabling between the AE and the power supply) are reduced. Thus, the undesirable effects of such transients in the read mode circuitry are reduced so that write-to-read mode recovery times can be shortened.

DETAILED DESCRIPTION OF THE PREFERRED EMBODIMENTS

According to the present invention, arm electronics (AE) has write mode circuitry configured to operate the AE in a write mode during which a write mode supply current is drawn, and read mode circuitry configured to operate the AE in a read mode during which a read mode supply current is drawn. The AE uses a decaying current pulse generator for generating a decaying current pulse at the beginning of each transition from the write mode to the read mode. Preferably, the decaying current pulse has an initial value that is equal to the difference between the write mode supply current and the read mode supply current. This "controlled load" forces the AE to draw a gradually decreasing supply current for each write-to-read mode transition, such that supply voltage transients (otherwise present due to parasitics in cabling between the AE and power supply) are reduced. Thus, the undesirable effects of such transients in the read mode circuitry are reduced so that write-to-read mode recovery times can be shortened.

Figure 7:
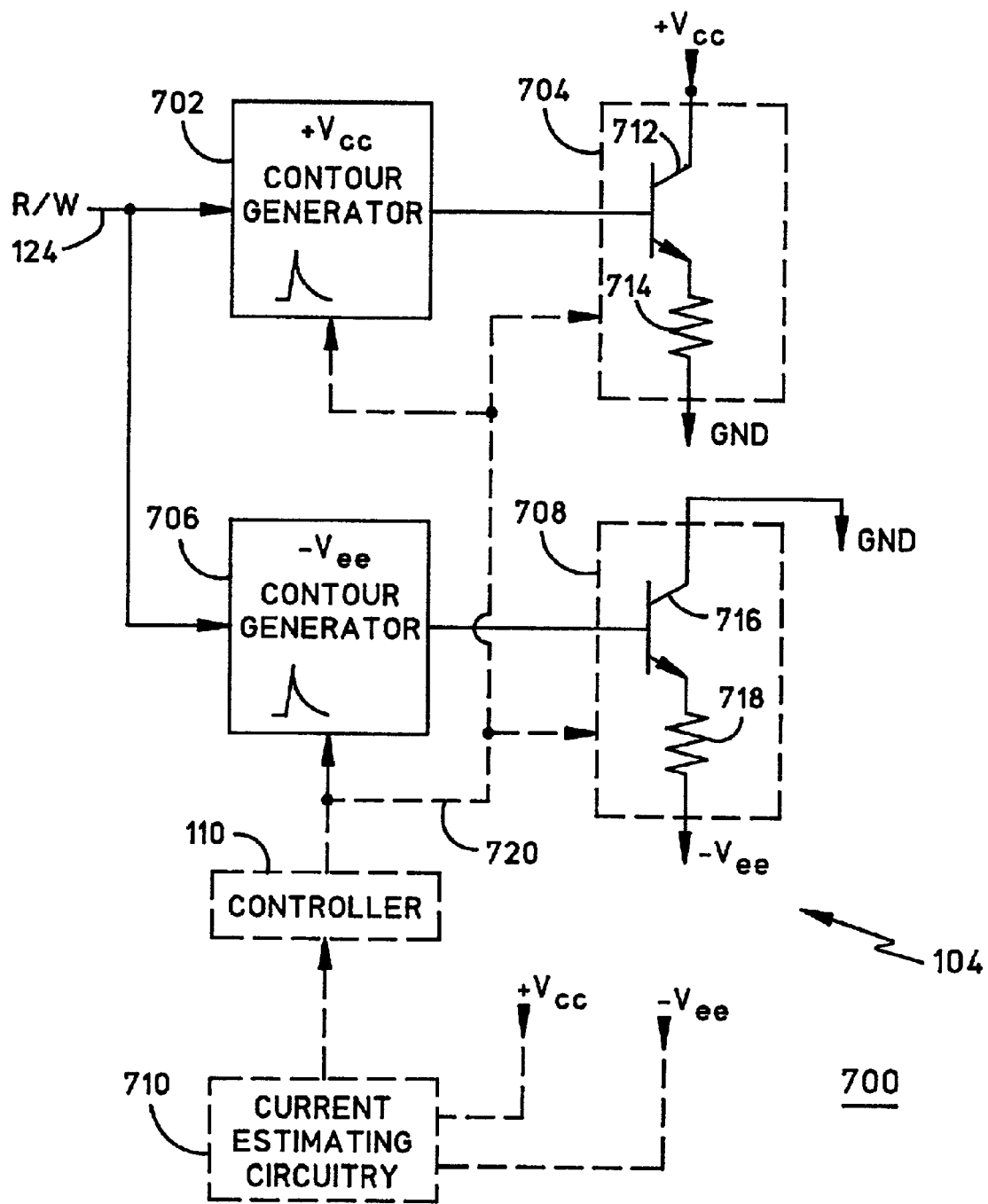
FIG. 7 is a schematic block diagram of circuitry for gradually decreasing supply current demand in the AE during write-to-read mode transitions.

FIG. 7 is a schematic block diagram of circuitry 700 in arm electronics for gradually decreasing the supply current demand for write-to-read mode transitions. Circuitry 700 is utilized in AE 104 and disk drive 100 of FIG. 1 described in the Background of the Invention. With use of circuitry 700, each write-to-read mode supply current transition is no longer an abrupt step, but is rather a gradually declining ramp. Therefore, undesirable supply voltage fluctuations at power supply input 107 (FIG. 1) as well as disturbances in preamplifier output 306 (FIG. 3) are reduced, if not effectively eliminated.

Before examining the details in FIG. 7, it is noted that circuitry 700 basically utilizes an extra temporary parallel path of controlled current. The initial value of this controlled current is preferably equal to the difference in steady-state values between the write mode supply current and the read mode supply current. Thus, the immediate transition out of the write mode incurs no power supply current change at all; the difference is absorbed by circuitry 700. The final value of the controlled current is zero, so that the final value of the total supply current requirement is that which is required by read mode circuitry 112 itself. Each transition from the write mode to read mode is controlled in time such that, at the end of write mode and the onset of the read mode, the power supply current requirement instantaneously remains constant but then decreases at a ramp slew rate until the steady-state read mode supply current is drawn.

Figure 3:
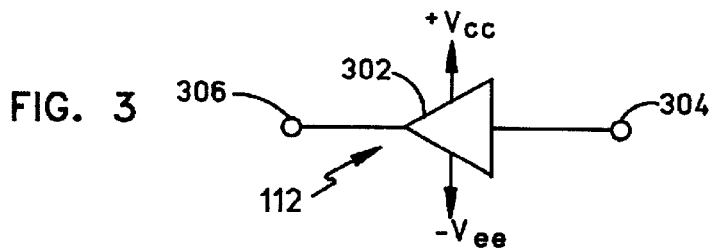
FIG. 3 is a preamplifier of read mode circuitry in the conventional AE of FIG. 1.

In this way, the change from the write mode supply current to the read mode supply current is lengthened so that the large undesirable transients in preamplifier output 306 of FIG. 3 are mitigated. Put another way, by increasing the perceived power supply rejection ratio (PSRR) of preamplifier 302 to infinity for each short write-to-read mode transition, the fluctuations at preamplifier output 306 are reduced.

It is generally noted that circuitry 700 of FIG. 7 is merely one example which achieves the results desired and therefore the invention is not limited to that which is described, unless explicitly recited in the claims. Circuitry 700 includes a contour generator 702 and accompanying power amplifier 704 for the $+V_{cc}$ supply side, and another contour generator 706 and accompanying power amplifier 708 for the $-V_{ee}$ supply side. Power amplifier 704 has a transistor 712 with a base coupled to an output of contour generator 702, a collector coupled to $+V_{cc}$, and an emitter coupled to one end of a resistor 714 which has another end coupled to ground. Power amplifier 708 has a transistor 716 with a base coupled to an output of contour generator 706, a collector coupled to the ground, and an emitter coupled to one end of a resistor 718 which has another end coupled to $-V_{ee}$. It is noted that circuitry for both $+V_{cc}$ and $-V_{ee}$ supply sides may not be needed for satisfactory operation, and that AE 104 using a single supply voltage will only need circuitry for the single supply side.

Figure 1:
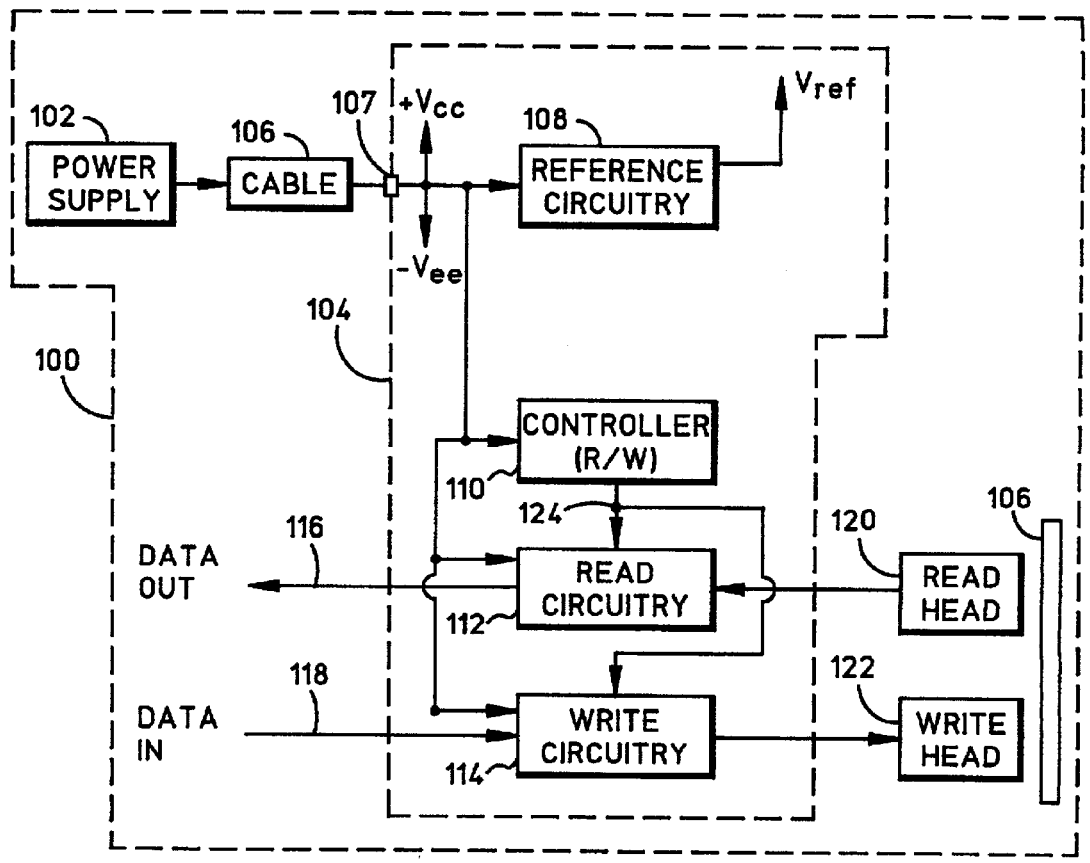
FIG. 1 is block diagram of a conventional disk drive having conventional arm electronics (AE)
Figure 2:
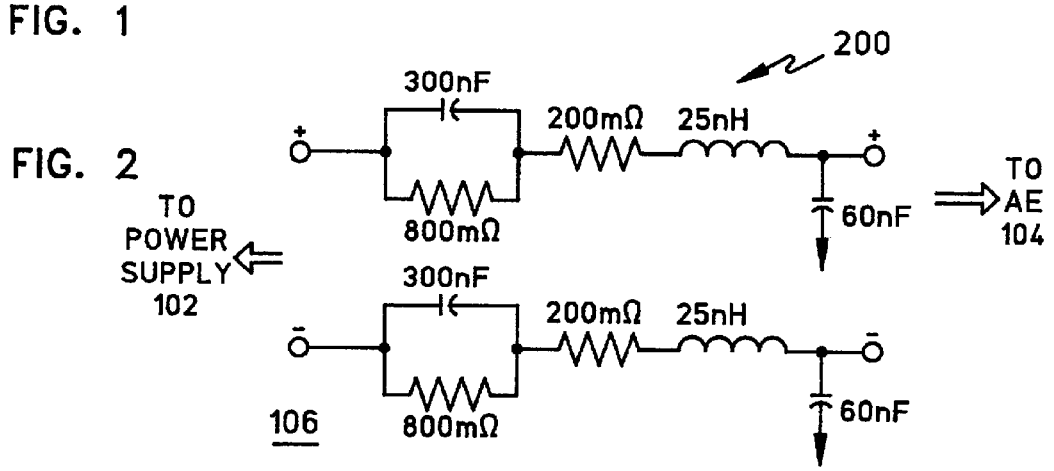
FIG. 2 is an example of a lumped-parameter model of a cable network in FIG. 1.

Contour generators 702 and 706 have inputs coupled to R/W mode signal 124 from controller 110 (FIG. 1). Circuitry 700 operates such that, when R/W mode signal 124 transitions from the write mode to the read mode, contour generators 702 and 706 each generate a decaying current pulse signal which is amplified by a corresponding power amplifier 704 or 708.

Basic illustrations of the decaying current pulses are shown in the blocks representing contour generators 702 and 706 in FIG. 7. Generally, a decaying current pulse signal is a current pulse that decays quickly over time (albeit slowly in comparison to what would otherwise occur in its absence). The decaying pulse signal jumps from zero to its initial value approximately instantaneously. The shape of the decay may be any suitable type; preferably, the shape of the decay is exponential or trapezoidal. After the decay, the supply current of AE 104 reaches the read mode supply current.

As apparent, circuitry 700 may be referred to as including controlled load circuitry or one or more decaying current pulse generators. It is noted that the initial values and shapes of the decaying current pulses may be different for the $+V_{cc}$ and $-V_{ee}$ sides depending on what is optimal or desired. When R/W mode signal 124 transitions from the read mode to the write mode, contour generators 702 and 706 do not generate any contoured signal.

Preferably, the initial value of each decaying current pulses is equal to the difference between the write mode supply current and the read mode supply current. This initial value may be predetermined and fixed (i.e., determined during the design phase and set prior to end-user operation of disk drive 100). On the other hand, the initial value of each decaying current pulse may be optimized in real-time and set one or more times during end-user operation of disk drive 100. Although not critical to the invention, the extent of the advantage of the invention depends upon how accurately the difference between the power supply current requirements for both modes of operation can be estimated (whether predetermined or measured in situ) and employed as an initial value for each decaying current pulse. If the most ideal or optimal ramp shape characteristics are to be identified and used, analysis may be needed to tailor to each specific product configuration.

If the real-time current estimate approach is utilized, circuitry 700 further includes current estimating circuitry 710 coupled to controller 110 and a parameter bus 720 for sending data parameters from controller 110 to contour generators 702 and 706 and power amplifiers 704 and 708. Current estimating circuitry 710 is used to estimate the write and read mode supply currents in real time, or alternatively during a "learning mode" which is different from the conventional end-user operating mode (and occurs, for example, prior to disk drive use). Together, current estimating circuitry 710 and controller 110 provide and set an estimated initial current pulse value that is equal to the difference between the estimated write mode supply current and the estimated read mode supply current for circuitry 700. Current estimating circuitry 710 may include, for example, conventional circuitry such as comparators and digital-to-analog converters (DACs) as one skilled in the art will understand. AE 104 may be further configured so that other aspects of the shape of the decaying current pulses can be modified, which will be described in more detail later below.

Figure 8:
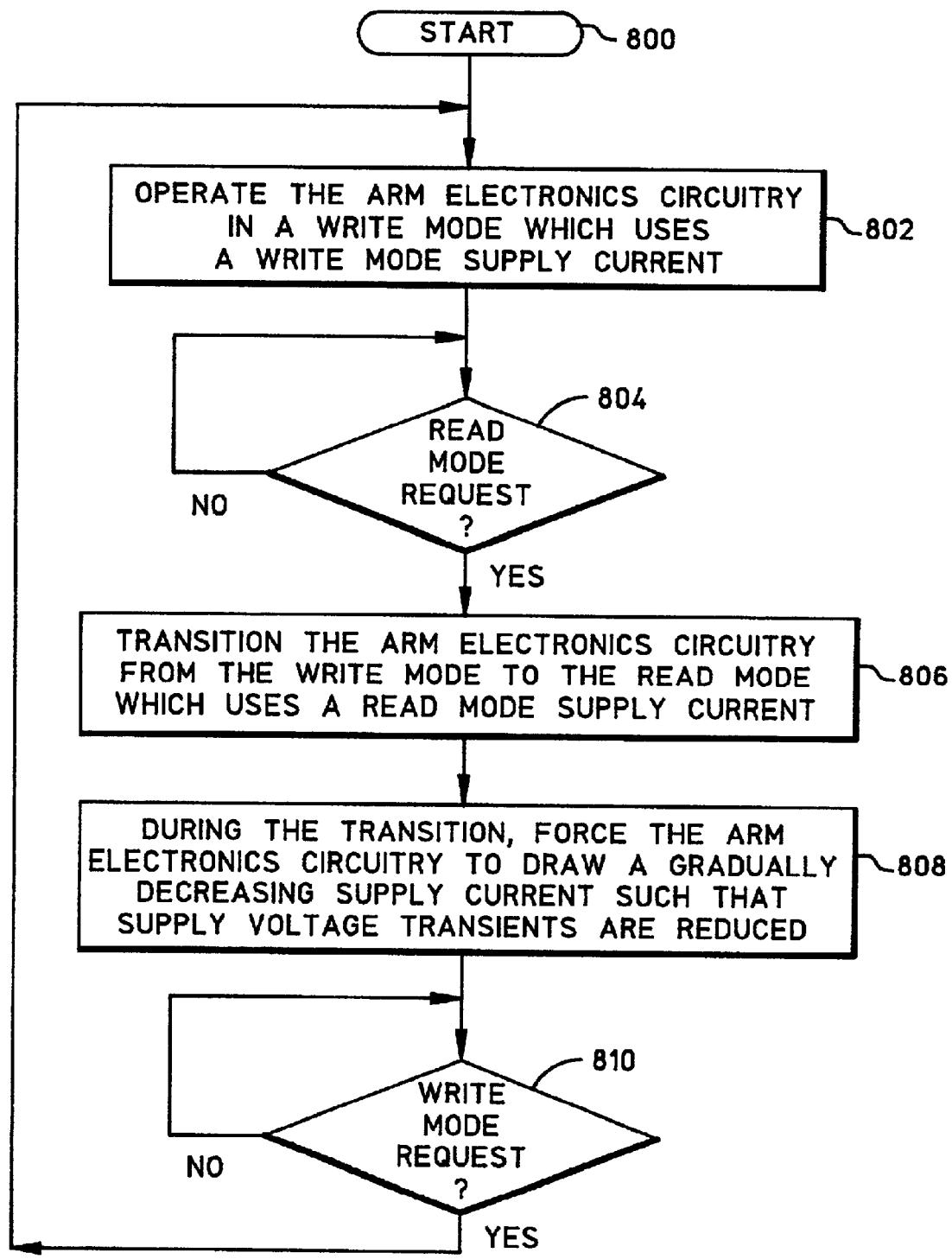
FIG. 8 is a flowchart describing a method of gradually decreasing supply current demand in the AE during write-to-read mode transitions.

FIG. 8 is a flowchart describing a method of gradually decreasing a supply current demand in AE 104. In the following description, FIGS. 1, 7, and 8 are referred to in combination. Beginning at a start block 800 of FIG. 8, AE 104 (FIG. 1) is operated in a write mode during which a write mode supply current is drawn (step 802). In the write mode, basic functions of write mode circuitry 114 are active whereas the basic functions of read mode circuitry 112 are generally inactive. Write data are fed into write mode circuitry 114 at write input 118, passed to write head 112, and written to disk 106. The write mode supply current is greater than the read mode supply current. The write mode supply current may be, for example, about 210 milliamps.

When a read mode request is given at step 804 of FIG. 8, AE 104 (FIG. 1) transitions from the write mode to the read mode (step 806). During steady-state read mode, a read mode supply current which is less than the write mode supply current is utilized. The read mode supply current may be, for example, about 60 milliamps. In the read mode, the basic functions of read mode circuitry 112 are active whereas the basic functions of write mode circuitry 114 are generally inactive. Read data are read from disk 106 by read head 120, passed to read circuitry 112, and provided at read output 116 for further processing.

For the transition from the write mode to read mode in step 806 of FIG. 8, AE 104 (FIG. 1) is forced to draw a gradually decreasing supply current (step 808) in contrast to a step or step-like decrease in supply current. The supply current is decreased slowly enough such that supply voltage transients (e.g., those described in relation to FIG. 5) at power supply input 107 are reduced. For example, the gradually decreasing supply current may be in the form of a decreasing ramp which takes about 250 nanoseconds to transition from the write mode supply current to the read mode supply current.

Preferably, as described in relation to FIG. 7, a decaying current pulse generator for generating a decaying current pulse is used to accomplish that described in relation to step 808. When a write mode request is given at step 810, AE 104 transitions from the read mode to the write mode and the method repeats starting again at step 802. Thus, the supply current is gradually decreased for each write-to-read mode transition.

The method may also include the further steps of estimating the write and read mode supply currents during operation of AE 104, and setting the initial value of the decaying current pulse to be equal to the difference between the estimated write mode supply current and the estimated read mode supply current. As described in relation to FIG. 7, these additional steps may use current estimating circuitry 710. The estimating of the write mode supply current may occur after step 802 of FIG. 8, and the estimating of the read mode supply current may occur after step 808.

Figure 4:
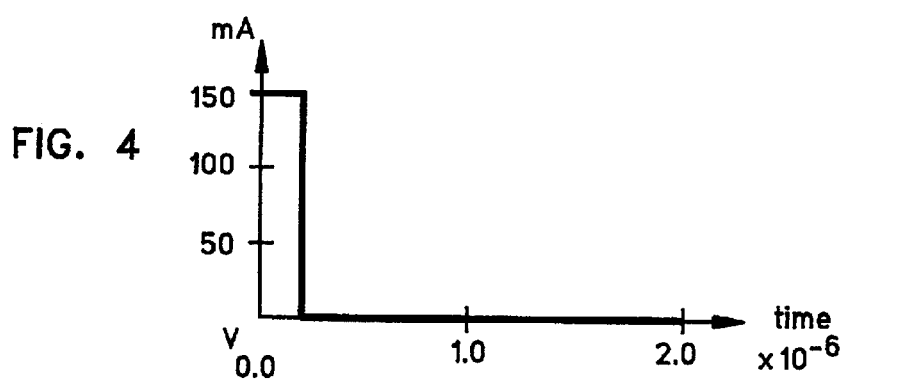
FIG. 4 is an example illustration of the relative power supply current requirement difference between write and read mode using the conventional AE of FIG. 1.
Figure 9:
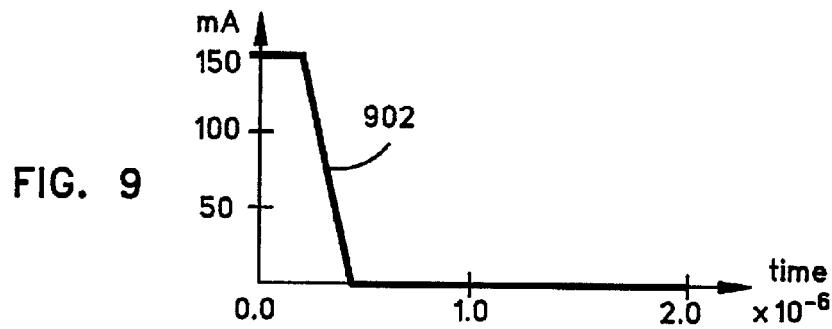
FIG. 9 is an example illustration of a write-to-read current transition requirement having the appearance of a declining ramp using the circuitry in FIG. 7 and/or the method of FIG. 8.

FIG. 9 is an example illustration of a write-to-read current transition requirement 902 having the appearance of a declining ramp signal. This write-to-read current transition requirement 902 is an example of the gradually decreasing supply current described in relation to step 808 of FIG. 8 and/or that which is drawn using circuitry 700 of FIG. 7. The declining ramp signal in FIG. 9 should be compared with write-to-read current transition requirement 402 of FIG. 4 which has a step or step-like discontinuity. Write-to-read current transition requirement 902 is not a step or step-like discontinuity, as it takes about 250 nanoseconds to reach the read mode supply current of 60 milliamps (from 210 milliamps) in this example.

Figure 5:
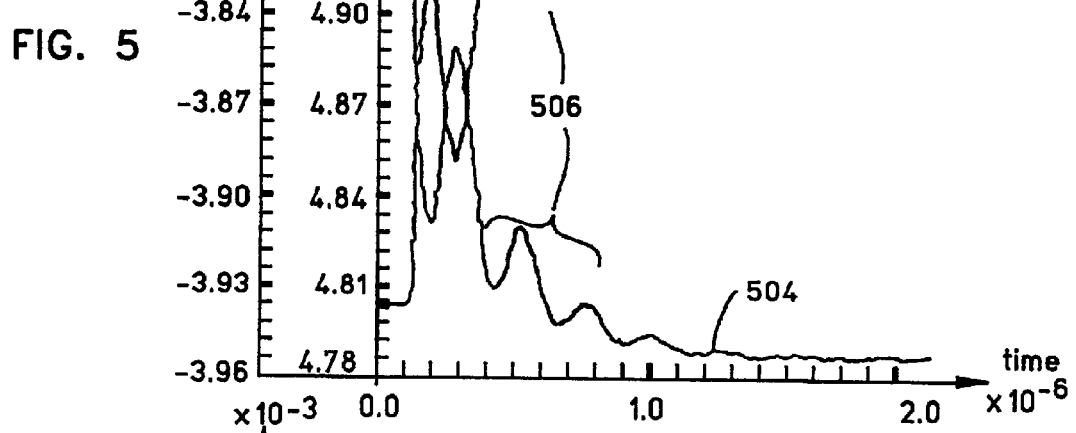
FIG. 5 is an example illustration of write-to-read supply voltage transition signals having voltage fluctuations using the conventional AE of FIG. 1.
Figure 10:
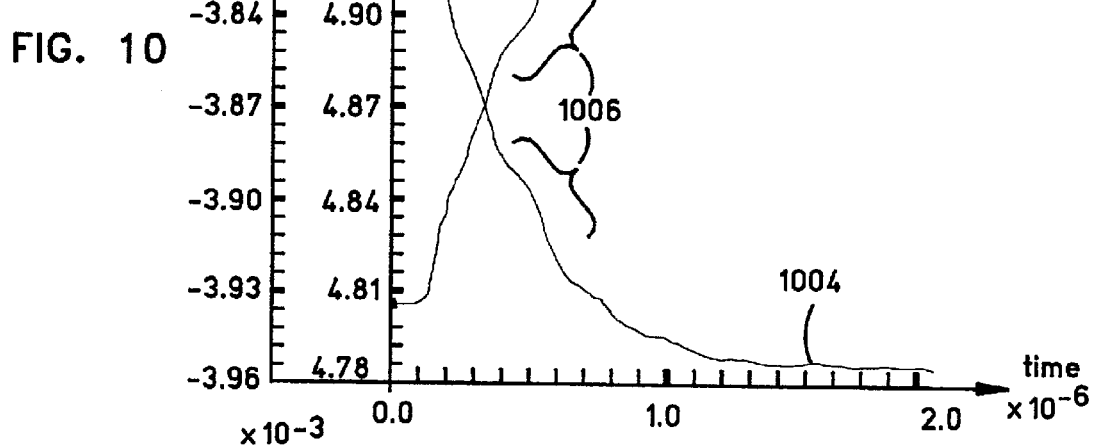
FIG. 10 is an example illustration of write-to-read supply voltage transition signals which have reduced voltage fluctuations using the circuitry in FIG. 7 and/or the method of FIG. 8.

FIG. 10 is an example illustration of write-to-read supply voltage transition signals 1002 and 1004 ($+V_{cc}$ and $-V_{ee}$, respectively) which have reduced voltage fluctuations 1006, especially in comparison to voltage fluctuations 506 shown in FIG. 5. These write-to-read supply voltage transition signals 1002 and 1004 reflect an example of the reduced supply voltage transients described in relation to step 808 of FIG. 8 and/or using circuitry 700 of FIG. 7.

Figure 6:
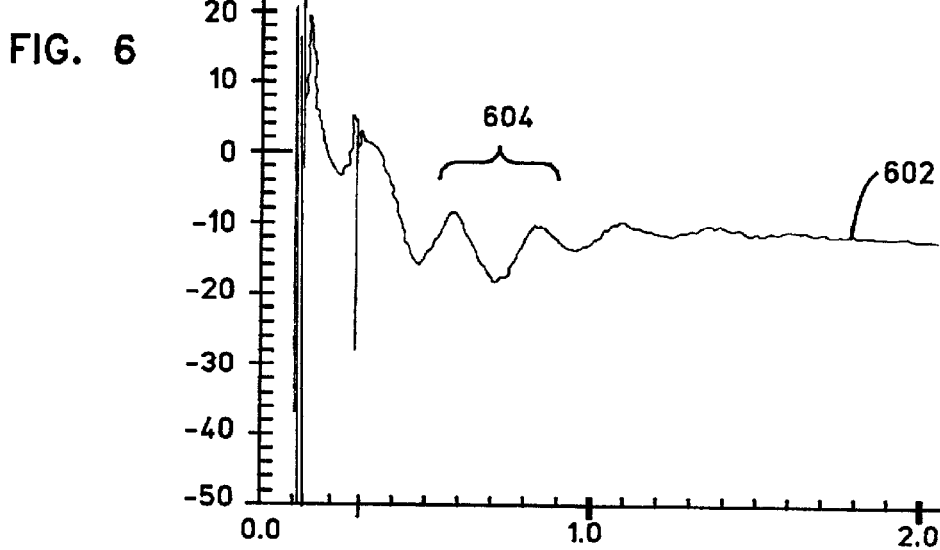
FIG. 6 is an example illustration of a preamplifier output signal being adversely affected by the voltage fluctuations in the write-to-read supply voltage transition signals of FIG. 5.
Figure 11:
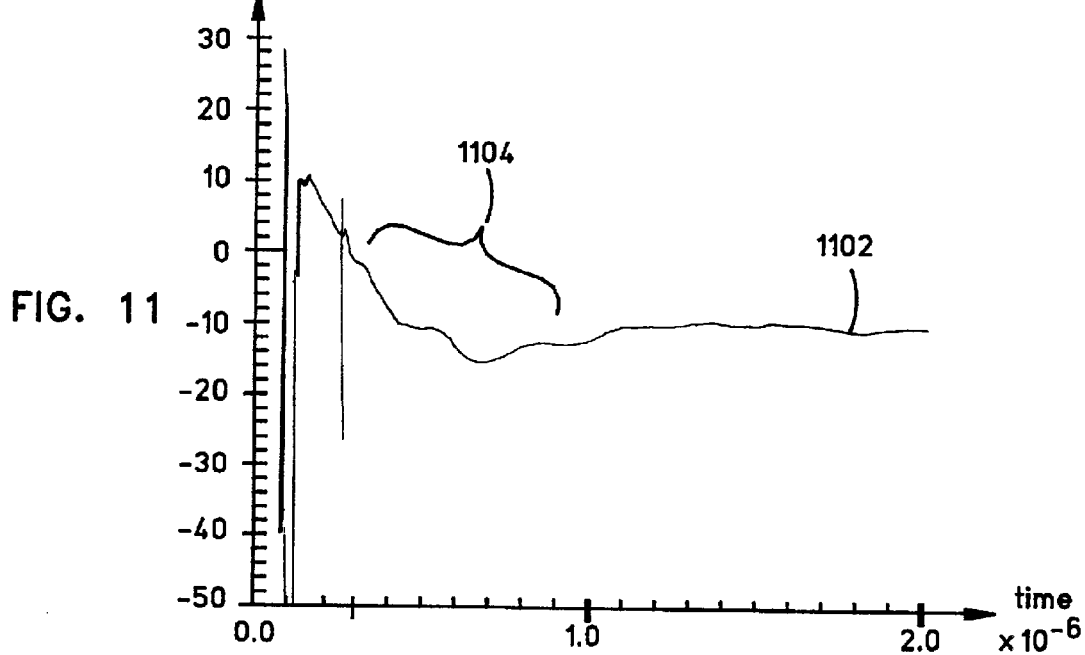
FIG. 11 is an example illustration of a preamplifier output signal which is less adversely affected by any voltage fluctuations using the circuitry in FIG. 7 and/or the method of FIG. 8.

FIG. 11 is an example illustration of a preamplifier output signal 1102 that is less affected by the reduced supply voltage fluctuations. Preamplifier output signal 1102 is an example illustrating the effect of reduced transients from step 808 of FIG. 8 and/or using circuitry 700 of FIG. 7. Preamplifier output signal 1102 of FIG. 11 should be compared with preamplifier output signal 602 of FIG. 6. The amplitude and frequency of signal fluctuations 1104 of preamplifier output signal 1102 are reduced, which allows for quicker write-to-read mode transitions and reliable data detection during the beginnings of read modes. Comparing FIGS. 6 and 11, the write-to-read mode recovery time can be reduced from about 1.5 microseconds to about 0.5 microseconds, with a write-to-read mode recovery time reduction of about 1 microsecond.

As mentioned above, circuitry 700 of FIG. 7 may also be configured so that the shape of the decaying current pulses may be changed or modified. Here, controller 110 and parameter bus 720 again are utilized to set the various parameters so that the appropriate shapes can be obtained. This type of arrangement is better suited to handle unknown variables outside the system, such as wiring parasitics and power supply regulation, so as to minimize transient anomalies. Since the waveforms generated for $+V_{cc}$ and $-V_{ee}$ may not be identical, contour generator 702 and power amplifier 704 for $+V_{cc}$ may need to be configured differently than contour generator 706 and power amplifier 708 for $-V_{ee}$ for the best performance. Thus, the system can be electronically tuned for variable system parasitics and supply requirements to achieve optimal results.

Variable parameters for contour generators 702 and 706 may include, but are not limited to, rise time, decay time, decay time constant (or rate), onset delay, and initial amplitude. Variable parameters for power amplifiers 704 and 708 may include, but are not limited to, gain and offset. The power amplifier gain and initial amplitude combine to result in an initial current magnitude. The onset delay results in a delay in the initial current. As preferred, the initial current magnitude is set as close as possible to the difference between the write mode and read mode supply currents to minimize the fluctuations in supply voltage at power supply input 107 during write-to-read mode transitions. Additionally, the decay characteristics (absolute time and waveshape) contained in the decay time and the decay time constant equally contribute to the mitigation of the voltage fluctuations. This waveform shaping circuitry may therefore control and set any aspect of the decaying current pulses.

Suitable initial values for the decaying current pulses may be obtained as follows. As an example, average write and read mode currents may be approximated ahead of time (e.g., via simulation results) in order to obtain an average current difference. As another example, a feedback loop may be utilized for detecting the real-time current that provides the shortest write-to-read recovery time. With this approach, the write-to-read recovery time can be measured during steps 806 and 808 of FIG. 8. Alternatively, a feed-forward scheme which takes advantage of the understanding of particular disk drive variables may be utilized to estimate the currents and/or initial values of the decaying current pulses. This approach will now be described.

Power consumption may be dependent upon certain disk drive variables that are not fixed or that change during operation, making it somewhat inconvenient to always obtain the exact difference between the write and read mode supply currents and the ideal waveshape. To obtain optimal waveforms given these circumstances, the variable parameters of contour generators 702 and 706 and power amplifiers 704 and 708 may be set as a function of one or more of these disk drive variables. Disk drive variables for use in such a feed-forward scheme are provided and explained in Table 1 below:

TABLE 1

Disk drive variables and their impact on supply current.

| Disk Drive Variable | Explanation | Read Mode Power | Write Mode Power |
|---|---|---|---|
| $V_{cc}$ | Higher $V_{cc}$ results in higher overall AE power dissipation | 2 | 2 |
| $I_w$ | Higher write current increases write mode power | X | 3 |
| $V_b$ | Higher read bias voltage increases read mode power | 3 | X |
| $R_w$ | Lower resistance of write head increases write mode power in a voltage-type driver | X | 3 |
| $R_h$ | Lower resistance of MR head increases read mode power for a give $V_b$ | 3 | X |
| Other | Different read/write mode power may exist depending upon imposition | 1, 2, or 3 | 1, 2, or 3 |

Legend:
X = Not Applicable;
1 = These parameters are relatively small contributors to power and therefore they can be effectively neglected in the approximation of power requirements;
2 = These parameters substantially track the write and read mode power; and
3 = These parameters are uncorrelated with respect to write and read mode power and are therefore most critical to approximate accurately.

To illustrate further by example, since write mode current $I_w$ and read mode bias voltage $V_b$ are determined by digital configuration information, the same information could also determine appropriate changes to the write and read mode power for calculating the supply current difference. As another example, since loop information is available for $V_b$ and $I_b$, the MR head resistance $R_h$ can be calculated and along with the read mode supply current.

Thus, special methods and apparatus for use in AE have been disclosed. In one aspect of the present invention, the AE has write mode circuitry configured to operate the AE in a write mode during which a write mode supply current is drawn, and read mode circuitry configured to operate the AE in a read mode during which a read mode supply current is drawn. The AE utilizes a decaying current pulse generator for generating a decaying current pulse at the beginning of each transition from the write mode to the read mode. Preferably, the decaying current pulse has an initial value that is equal to the difference between the write mode supply current and the read mode supply current. This "controlled load" forces the AE to draw a gradually decreasing supply current for each write-to-read mode transition, such that supply voltage transients (otherwise present due to parasitics in the cabling between the AE and the power supply) are reduced. Thus, the undesirable effects of such transients in the read mode circuitry are reduced so that write-to-read mode recovery times can be shortened.

An inventive method of operating arm electronics circuitry includes the acts of operating the arm electronics circuitry in a write mode wherein a write mode supply current is drawn; transitioning the arm electronics circuitry from the write mode to a read mode wherein a read mode supply current is drawn; and controlling the arm electronics circuitry to draw a gradually decreasing supply current during the transitioning such that supply voltage transients are reduced. Preferably, the act of controlling the arm electronics circuitry to draw the gradually decreasing supply current further comprises the act of generating a decaying current pulse in the arm electronics circuitry, where the decaying current pulse has an initial value that is equal to the difference between the write mode supply current and the read mode supply current.

Finally, a disk drive configured in accordance with the present invention includes arm electronics circuitry; a power supply for supplying power to the arm electronics circuitry; and a cable for coupling the power supply and the arm electronics circuitry. The arm electronics circuitry further includes write mode circuitry configured to operate the arm electronics circuitry in a write mode during which a write mode supply current is drawn from the power supply through the cable; read mode circuitry configured to operate the arm electronics circuitry in a read mode during which a read mode supply current is drawn from the power supply through the cable, where the read mode supply current is less than the write mode supply current; and controlled load circuitry which is operative to control the arm electronics circuitry to draw a gradually decreasing supply current for each write-to-read mode transition so that voltage transients from the power supply through the cable are reduced. Preferably, the controlled load circuitry comprises a decaying current pulse generator which generates a single decaying current pulse having an initial value that is equal to the difference between the write mode supply current and the read mode supply current.

In the prior art, improving circuit PSRR has been approached as a means to mitigate transient recovery problems but this can only correct the problem to a limited extent. In contrast, the present invention approaches the problem by minimizing a root cause disturbance. That is, whereas the prior art attempts to build a robustness against the disturbance, the present invention minimizes the disturbance itself.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. Arm electronics circuitry, comprising:
   write mode circuitry configured to operate the arm electronics circuitry in a write mode during which a write mode supply current is drawn;
   read mode circuitry configured to operate the arm electronics circuitry in a read mode during which a read mode supply current is drawn;
   controlled load circuitry configured to force the arm electronics circuitry to draw a gradually decreasing supply current for each transition from the write mode to the read mode such that supply voltage transients are reduced; and
   the controlled load circuitry comprising a decaying current pulse generator which generates a decaying current pulse having an initial value that is equal to the difference between the write mode supply current and the read mode supply current.

2. The arm electronics circuitry of claim 1, wherein the supply voltage transients are due to a non-ideal connector coupled between the arm electronics circuitry and a power supply of the arm electronics circuitry.

3. The arm electronics circuitry of claim 1, further comprising:
   a preamplifier in the read mode circuitry; and
   wherein, by reducing supply voltage transients, the controlled load circuitry reduces the effects of such transients at an output of the preamplifier.

4. The arm electronics circuitry of claim 1, wherein the decaying current pulse has a waveform that is variable and changeable during use of the arm electronics circuitry.

5. The arm electronics circuitry of claim 1, the disk drive further comprising:
   current estimating circuitry for estimating the write and the read mode supply currents; and
   waveform shaping circuitry for shaping the waveform based on the measured write and read mode supply currents from the current estimating circuitry.

6. A method of operating arm electronics circuitry, comprising:
   operating the arm electronics circuitry in a write mode wherein a write mode supply current is drawn;
   transitioning the arm electronics circuitry from the write mode to a read mode wherein a read mode supply current is drawn; and
   controlling the arm electronics circuitry to draw a gradually decreasing supply current for the transition such that supply voltage transients are reduced by generating a decaying current pulse having an initial value that is equal to the difference between the write mode supply current and the read mode supply current.

7. The method of claim 6, further comprising:
   repeating the act of controlling the arm electronics circuitry to draw the gradually decreasing supply current for each one of a plurality of write-to-read mode transitions.

8. The method of claim 6, wherein the decaying current pulse has an exponential decay.

9. The method of claim 6, wherein the decaying current pulse has a waveform that is variable and changeable during use of the arm electronics circuitry.

10. The method of claim 6, further comprising:
    estimating the write and read mode supply currents; and
    changing the initial value of the decaying current pulse based on the estimating.

11. Arm electronics (AE) suitable for use in a disk drive, the AE comprising:
    write mode circuitry configured to operate the AE in a write mode during which a write mode supply current is drawn;
    read mode circuitry configured to operate the AE in a read mode during which a read mode supply current is drawn;
    the read mode circuitry including a preamplifier;
    a decaying current pulse generator which generates a decaying current pulse at the beginning of each one of a plurality of transitions from the write mode to the read mode;

the decaying current pulse having an initial value that is equal to the difference between the write mode supply current and the read mode supply current; and the decaying current pulse generator operating to force the AE to draw a gradually decreasing supply current for each write-to-read mode transition such that supply voltage transients are reduced and the effects of such transients at an output of the preamplifier are reduced.

12. A disk drive, comprising:

arm electronics circuitry;

a power supply for supplying power to the arm electronics circuitry;

a cable for coupling the power supply and the arm electronics circuitry;

the arm electronics circuitry including:
    write mode circuitry configured to operate the arm electronics circuitry in a write mode during which a write mode supply current is drawn from the power supply through the cable;
    read mode circuitry configured to operate the arm electronics circuitry in a read mode during which a read mode supply current is drawn from the power supply through the cable, the read mode supply current being less than the write mode supply current;
    controlled load circuitry which is operative to force the arm electronics circuitry to draw a gradually decreasing supply current for each write-to-read mode transition so that voltage transients from the power supply through the cable are reduced; and
    a decaying current pulse generator of the controlled load circuitry which generates a decaying current pulse having an initial value that is equal to the difference between the write mode supply current and the read mode supply current.

13. The disk drive of claim 12, wherein the decaying current pulse has an exponential decay.

14. The disk drive of claim 12, further comprising:

a preamplifier in the read mode circuitry; and wherein, by reducing voltage transients from the power supply, the controlled load circuitry reduces the effects of such transients at an output of the preamplifier.

15. The disk drive of claim 12, wherein the decaying current pulse has a waveform that is variable and changeable during use of the arm electronics circuitry.

16. The disk drive of claim 12, further comprising:

current estimating circuitry for estimating the write and the read mode supply currents; and waveform shaping circuitry for setting a shape of the waveform based on the current estimating circuitry.

* * * * *